March 21, 1961 P. S. BLATZ 2,976,184
METHOD OF COATING A POLYMERIC THERMOPLASTIC DIELECTRIC
FILM AND ARTICLE PRODUCED THEREBY
Filed Nov. 28, 1955
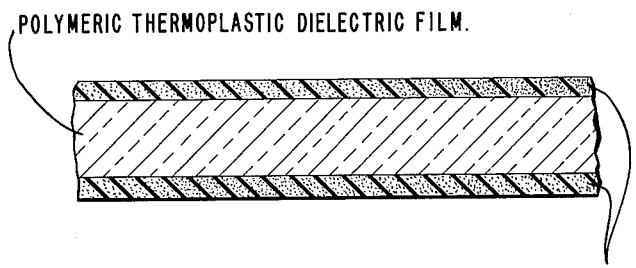
POLYMERIC THERMOPLASTIC DIELECTRIC FILM.
CURED BLEND OF POLYMERIC SILICONE
RESIN AND FINELY DIVIDED PARTICLES
OF AMORPHOUS SILICA, ESTERSILS, FINELY
DIVIDED CLAYS OR MICA.
INVENTOR
PHILIP STRUBING BLATZ
BY *Herbert M. Wolfson*
ATTORNEY

United States Patent Office 2,976,184
Patented Mar. 21, 1961

2,976,184

METHOD OF COATING A POLYMERIC THERMO-PLASTIC DIELECTRIC FILM AND ARTICLE PRODUCED THEREBY

Philip Strubing Blatz, Buffalo, N.Y., assignor to E. I. du Pont de Nemours and Company, Wilmington, Del., a corporation of Delaware Filed Nov. 28, 1955, Ser. No. 549,518

16 Claims. (Cl. 117—138.8)

This invention relates to a process of improving the dielectric life of polymeric thermoplastic materials useful as electrical insulation and to the product of such process, and, more particularly, to a coated polyethylene terephthalate film having an improved dielectric life.

Polyethylene terephthalate film, particularly oriented film (film which has been stretched and/or rolled in two directions and heat-set at elevated temperatures within the range from 150°–250° C.) has been found to possess a unique combination of electrical, physical, and chemical properties which make it outstanding for use as a dielectric. This is particularly true of polyethylene terephthalate film which has been stretched and/or rolled to substantially the same degree in both directions, e.g., 3X, where X equals the original dimension of the film, to obtain a substantially "balanced" film which means that the physical properties of the film as measured in both directions are substantially the same. The oriented, heat-set, polyethylene terephthalate film is outstanding as a dielectric because it retains a considerable percentage of its electrical properties, strength, and durability at elevated operating temperatures. Consequently, the film is particularly useful as a dielectric in capacitors, motors, generators, transformers, etc., at not only moderate operating temperatures, but also at ambient temperatures approaching 150°–175° C.

In extending the usefulness of polyethylene terephthalate and like thermoplastic polymeric film dielectric to a wider variety of electrical end uses, it became apparent that the dielectric life of the film required improvement, particularly for use in equipment subjected to high voltage stresses. As employed herein, the term "dielectric life" of the polymeric thermoplastic film applies to the actual time that a particular film may be subjected to a particular voltage stress under conditions of corona discharge before actual physical breakdown, i.e., rupture, of the film dielectric.

It is the action upon the polymeric film dielectric of corona discharge (in air or other gaseous medium) which causes actual physical breakdown of the film under conditions of a particular voltage stress (a potential difference large enough to produce a visible discharge but not large enough to produce instantaneous breakdown). Obviously, the lower the voltage stress, the longer the dielectric life of the film. "Corona discharge" is defined as the discharge of electricity which appears upon the surface of a conductor when the potential gradient exceeds a certain value. For example, when a continuous potential applied to a pair of narrow wires is slowly increased, the voltage will be reached at which a hissing noise is heard, and a pale violet light is visible (in the dark) around the wires. This voltage is defined as the "critical visual corona point." Corona is due to ionization of the air or surrounding gases (it does not occur in a vacuum). That is, the air in the ionized region is conducting, and this results in increasing the effective diameter of the conductor. For example, even though a film dielectric is wound tightly around a wire, air is not entirely excluded from the space between the conductor and the film dielectric; and it is the air or other gaseous medium which is ionized. The corona envelopes a conductor as a concentric cylinder, and the outside diameter becomes such that the gradient at that point decreases to the rupturing point of the air. Beyond this point, the corona cannot increase for the constant applied voltage because the gradient decreases with increasing radial distance from the wire. The glow or breakdown of the surrounding air starts first at the point of maximum gradient or at the conductor surface. It is the bombardment of the dielectric film with ions or electrons that actually results initially in roughening or pitting the surface of the film. As the bombardment continues, the film eventually ruptures; hence, this causes short circuits owing to the physical failure.

An object of the present invention is to provide a polymeric thermoplastic dielectric film having increased dielectric life. A further object is to provide a polyethylene terephthalate film dielectric having increased dielectric life. A further object is to provide a process of improving the dielectric life of polymeric thermoplastic dielectric compositions, particularly polyethylene terephthalate film. A still further object is to provide a novel coating composition useful for improving the dielectric life of polymeric thermoplastic dielectric film. Other objects will be apparent from the following description of the invention.

These objects are realized in accordance with the present invention which, briefly stated, comprises providing a dielectric base film of thermoplastic polymeric material, e.g., polyethylene terephthalate with a relatively thin adherent continuous coating of a cured homogeneous blend comprised essentially of a polymeric silicone resin, and finely divided particles from the group consisting of amorphous silica, estersils, finely divided clays and mica, said particles having an ultimate average particle size between 5 millimicrons and 5 microns.

The present invention will be further described specifically with respect to improving the dielectric life of polyethylene terephthalate film, but it should be understood that the invention is applicable as well to enhancing the dielectric life of other types of unplasticized polymeric thermoplastic films useful as dielectrics, such as films of polyethylene, polytetrafluoroethylene, polystyrene, polyamides, etc.

The silicone resins which may be employed in preparing the present coating compositions include a variety of wellknown silicone resins fully described in the prior art. For example, United States Patents Numbers 2,258,218, -220, -221 and -222 in the name of E. G. Rochow, describe and claim a variety of types of silicone resins which may be employed in preparing the present coating compositions. The methyl polysiloxane resins, also known as methyl silicone resins, are described and claimed in United States Patent No. 2,258,218. These heat-hardenable methyl polysiloxane resins may be prepared, for example, by hydrolysis of suitable mixtures of methyl silicon halides, or mixtures of methyl silicon halides and a silicon tetrahalide, in such proportion that the resulting methyl polysiloxane resins contain an average of from 1 to substantially less than 2, preferably 1.3 to 1.7 methyl groups per silicon atom. The liquid hydrolysis and condensation products are resinous materials which may be further condensed or polymerized to a solid state.

Depending upon the nature of the starting materials employed in preparing, for example, a methyl silicone resin, the polymer chains are generally made up of the following types of unit structures. The dimethylsiloxy group,

comprises a considerable portion of the polymeric chains, particularly when the methyl-to-silicon ratio approaches 2. Generally, the above structural unit is assumed to include half of each of the two associated oxygen atoms and, hence, is more properly written,

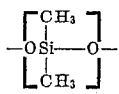

The presence of the monomethyl siloxane structural unit in the polymer chain accounts for the considerable degree of cross-linking in the structure of the silicon resins, particularly those having a methyl-to-silicon ratio considerably less than 2, e.g., 1.2, 1.3, 1.5. The monomethyl siloxane unit is written as,

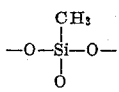

A third type of structural unit which may be found in the methyl siloxane resines is the trimethyl siloxy radical,

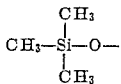

This structural unit is found as a terminal unit of a polymer chain in that the methyl groups are not capable of further condensing.

As mentioned above, other groups or radicals may replace the methyl groups in the above illustrations of typical structural units, and the resulting siloxane resins take on different characteristics. For example, United States Patent No. 2,258,220 describes and claims ethyl polysiloxane resins (ethyl silicone resins). The structure of these resins comprises structural units similar to those illustrated above except that the ethyl group replaces the methyl group.

United States Patent No. 2,258,221 describes aroxyaryl or aroxyalkyl silicone resins. Here again, the general structure of these resins contains structural groups similar to those given above except, for example, the methyl radicals are replaced with aroxyaryl or aroxyalkyl radicals.

Other available silicone resins useful for purposes of this invention are resins which contain unsaturated aliphatic radicals attached to the silicon atom, for example, methyl vinyl silicone resins.

United States Patent No. 2,258,222 describes still another type of silicone resin wherein one methyl radical in the structural units given above is replaced with an aryl group, such as a phenyl group or a halo-aryl radical. On the other hand, another useful group of silicone resins are the aryl silicone resins or aryl polysiloxane resins wherein all methyl groups in the above illustrated structural units are replaced with aryl groups, such as phenyl groups.

A considerable number of techniques and processes have been developed for preparing the silicone resins and three of the more common procedures, described with respect to preparing methyl silicone resins, are as follows:

(1) Dimethyl silicone may first be prepared by hydrolyzing dimethyldichlorosilane or its esters, and then oxidized with air and a catalyst in accordance with the process described in United States Patent No. 2,438,478 to attain the desired methyl-to-silicon ratio.

(2) Dimethyldichlorosilane may be mixed with methyltrichlorosilane or silicon tetrachloride and then hydrolyzed and the products co-condensed.

(3) Silicon tetrachloride may be partially methylated (as with methyl magnesium chloride) to the desired methyl-to-silicon ratio and the reaction mixture hydrolyzed directly as illustrated in United States Patent No. 2,258,218.

The methyl-to-silicon ratio of the final resin product is normally dependent upon the nature of the initial reactants or raw materials and the conditions of the condensation reaction. The closer the methyl-to-silicon ratio is to 2, the lower the degree of cross-linking in the resin structure; and as the methyl-to-silicon ratio approaches 1, the greater the degree of cross-linking in the resin structure. In general, it appears desirable to employ silicone resins in the present coating compositions having an R/Si ratio from about 1.3 to 1.8, where R stands for any of the types of substituent groups or combinations thereof, mentioned above, that is, methyl, ethyl, phenyl, etc. For example, when a methyl phenyl silicone resin is used, it is normally preferred to have a higher proportion of methyl groups than phenyl groups in the resin in order to avoid brittleness; for example, a resin having an average of 1.00 methyl group and 0.80 phenyl group per silicon atom. In the present invention it is preferred to employ a substantial quantity of the flexible silicone resins. For example, the methyl phenyl silicone resins have been found to be highly desirable from the standpoint of flexibility, these resins being more flexible than the dimethyl silicone resins and the diphenyl silicone resins. In general, it is preferable to employ a mixture of silicone resins, e.g., 50% of a flexible methyl phenyl silicone resin and 50% of faster-curing, but more brittle, dimethyl silicone resin. It is preferred that at least 50% of the mixture be a flexiblbe silicone resin.

Types of finely divided particles which are to be blended with the silicone resins are selected from the following compounds: (1) amorphous silica; (2) estersils as defined in U.S.P. 2,657,149; (3) finely divided clay; and (4) mica. The essential requirement is that whenever any of the above compounds are blended with the silicone resin, the compound must be in finely divided forms such that the ultimate particles, either in the form of super-colloidal aggregates or individual particles, have an average greatest dimension ranging between 5 millimicrons and 5 microns, and preferably below 50 millimicrons. Some of the above compounds may not be commercially available in finely divided form wherein the average particle size is 5 microns or less. In such cases, it is necessary to process the particles by ball milling or other techniques to reduce the size of the average particle.

A considerable number of commercially available types of amorphous silicas may be satisfactorily employed in the prevent invention, and the silicas may be arbitrarily divided into four classifications: aerogel, precipitated, vapor-phase and diatomaceous types. "Santocel" CS, manufactured by the Monsanto Chemical Company, is an example of the aerogel type. This is slightly acidic and contains small amounts of alcohol, water, and sodium sulfate as the chief impurities. The particle diameter is approximately 30 millimicrons, with a surface area of approximately 110 to 150 m.$^2$/gm. (square meters/gram). The precipitated silicas may be represented by "Hi-Sil" X303 or "Hi-Sil" XW, manufactured by the Columbia-Southern Chemical Corporation. This material has an average particle diameter of 20–25 millimicrons and a surface area within the range of 140–160 m.$^2$/gm. A typical representative of the vapor-phase type of silica is "Aerosil," manufactured by Godfrey L. Cabot, Inc., this material having an average particle diameter of approximately 15–20 millimicrons and a surface area of 175–200 m.$^2$/gm. Diatomaceous types of silicas may be further subdivided into two groups which are important in compounding the present coating compositions. These are the heat-calcined and flux-calcined materials. Both are relatively free from organic contaminants and have no adverse effect on vulcanizing systems usually employed.

Particle sizes are much larger than those of the silica mentioned above, ranging from 1–6 microns. The surface areas are larger than would be calculated from the particle diameter owing to high internal area in this form of silica. In the heat-calcined group are such products as: "Celite" 270, manufactured by Johns-Manville Corp., and "Dicalite" PS, manufactured by Great Lakes Carbon Corp.; in the flux-calcined group are "Dicalite" white, and "Celite" superfloss.

Estersils, described in U.S.P. 2,657,149 to Ralph K. Iler, embrace a class of compounds which are preferred components in the present coating compositions. In brief, the estersils are esterified super-colloidal substrates, that is, a substrate in the form of particles coated with —OR groups, the substrate having a surface of silica and having a specific surface area of at least 1 m.$^2$/gm., the coating of the —OR groups being chemically bound to said silica, and R being a hydrocarbon radical of at least 2 carbon atoms wherein the carbon atom attached to oxygen is also attached to hydrogen. In general, the estersils have a specific area of at least 1 m.$^2$/gm. and usually within the range of 1–900 m.$^2$/gm.

In attempting to apply coating compositions to polymeric thermoplastic films useful as dielectrics for the purpose of increasing the dielectric life of particular film, a number of influencing factors must be taken into consideration. That is, (1) the coating should not impair any of the desirable physical, chemical or electrical properties of the base film, for example, the coating should be substantially as flexible and non-tacky as the base film, (2) the coating must be capable of being applied homogeneously over the entire film surface in order that "pinholes" in the coating are not formed, and (3) the coating should be capable of being cured at moderate temperatures in order that the base film would not have to be subjected to excessively high curing temperatures. The present silicone resin coatings described herein fully meet the requirements. Furthermore, these coatings, even when applied as a very thin coating (less than 1 mil thickness on both sides of dielectric base film) are highly effective in materially extending the dielectric life of thermoplastic dielectric films, particularly at elevated temperatures.

The concentration of the finely divided compounds blended with the silicone resins may vary between 5–50% of the total weight of the blend. In general, the smaller the average particle size of the finely divided amorphous silica particles are estersil particles, the lower the concentration (by weight) necessary to produce a satisfactory coating for dielectric base film.

The present coating compositions are conveniently applied to thermoplastic polymeric base films from solutions thereof in solvents in which the blending of the silicone resin/finely divided particles has been carried out. Thus, in compounding and comparing the present coating compositions for application to base dielectric film, suitable quantities of the silicone resin (normally in the form of a viscous solution of the silicone resin solvent), and finely divided particles of amorphous silica or estersil are added to a suitable quantity of a volatile organic solvent for the resin such as toluene, xylene, carbon tetrachloride or chloroform. As mentioned hereinbefore, other materials such as additional curing agents may then be added. A mixture of materials is agitated with the solvent medium in a suitable mixing vessel; and the insoluble component, e.g., silica particles, estersil particles, etc., are uniformly suspended in the solution.

The final step in providing a thermoplastic dielectric film, e.g., polyethylene terephthalate film with a non-tacky uniform coating of the subject silicone resin/finely divided particles, is the curing of the resin at moderate or elevated temperatures. Normally, curing agents have already been incorporated into the resin when these compositions are obtained from the manufacturer. The curing agents already present in the compositions may or may not be satisfactory alone; hence, it may be necessary to add an additional curing agent to the coating composition in order to accelerate the rate of cure at any selected temperature. Most of the curing agents are designed to promote relatively rapid curing at moderately elevated temperatures; and it is important in the present situation to be able to effect curing at temperatures which will not adversely affect the physical, electrical and chemical properties of the base thermoplastic film dielectric. Numerous types of curing or vulcanizing agents may be employed and these are specifically listed and described in the prior art. Additional quantities of the curing agent may be added to the resin coating compositions in the form of solutions of the curing agents in the solvent, such as the same solvent in which the resin and filler are to be blended, e.g., toluene, xylene, etc. Various curing agents which may be employed for the silicone resins include lead salts, such as lead naphthenate, lead octoate, and zinc octoate.

The coating compositions may be applied to one or both surfaces, preferably both surfaces, of the base film by any desired expedient; and the coated film may thereafter be dried at room temperature or moderately elevated temperature to remove solvent. Curing of the silicone resin may be well effected at room temperature depending upon the curing agent, and in other cases, may be carried out at elevated temperatures, e.g., 100–175° C., for durations from ½ minute to 60 minutes.

It may be necessary, depending upon the end use for the coated dielectric films of the present invention, to apply a sub-coating to the base dielectric film, e.g., oriented heat-set polyethylene terephthalate film, to improve adhesion between the base film and the silicone resin coating. While applying the subject coating compositions to polyethylene terephthalate, it is preferred to apply a sub-coating which is chemically similar to the base film. Any suitable sub-coatings may be employed provided that they improve the adhesion between the base film and the present coatings and do not materially adversely affect the original combination of physical, electrical and chemical properties of the base film. Preferred sub-coatings, include copolyesters derived by reacting glycol, terephthalic acid, or low alkyl ester thereof with a second acid or alkyl ester thereof from the group consisting of sebacic acid, isophthalic acid, and hexahydroterephthalic acid. Normally, in preparing suitable sub-coatings, it is preferred that the sub-coating composition contain at least 50% of the terephthalic acid, based upon the total weight of the acid component. Sub-coats containing alkyl aryl silicones, e.g., methyl phenyl silicone, and organic esters of orthotitanic acid, e.g., tetrabutyl titanate may also be advantageously employed in the process of the present invention. The sub-coating compositions may be applied to the base dielectric film from solvent solutions, or homogeneous thin films of the copolyester compositions may be first applied to the dielectric base film by the lamination under heat and moderate pressure.

The figure in the drawing represents the preferred product of the present invention in which the dielectric base film of thermoplastic polymeric material is coated on both sides with a cured blend of a polymeric silicone resin and the specified finely divided particles.

The following examples of embodiments of the present invention can further illustrate the principles and practice of the invention. Parts are by weight.

EXAMPLE 1

The following formulation:

Methyl phenyl silicone resin (General Electric SR–17) _____parts__ 5
Dimethyl silicone resin (General Electric SR–98) _____parts__ 4
Estersil (described in U.S.P. 2,657,149) _____do____ 3
Lead octoate (catalyst to promote curing) _percent__ [1] 3

[1] Based on total weight of resin in component.

was dispersed in toluene to form a composition containing 20% solvents. This composition was placed in a container partially filled with glass beads, and the container was agitated on a rolling mill until a uniform dispersion of the non-soluble component (the estersil) was obtained. Oriented (stretched 3X in both directions) heat-set (at a temperature of about 200° C.) polyethylene terephthalate was employed as the base film dielectric. The base film (½ mil in thickness) was first coated with a thin coating (about 1 micron in thickness) applied from a solution of toluene containing 1 part of a methyl phenyl siloxane resin (General Electric SR–32), and 2 parts of tetraisopropyl titanate to form a solution containing 2% solvents in toluene. The base film was passed through solution, most of the coating was wiped off, and the coated film was heated in the presence of moisture. The sub-coated film was then passed through a solution of the silicone resin/filler blend and then between doctor rolls to remove excess coating composition. The coating was dried at room temperature for 1 hour. Thereafter, the coating was cured at 150° C. for 15 to 30 minutes. The resulting coating was smooth, nontacky, and firmly adherent to the base polyethylene terephthalate film.

EXAMPLE 2

The following formulation:

Methyl phenyl silicone (General Electric SR–32) _____parts__ 3
Estersil (described in U.S.P. 2,657,149)____do_____ 1
Lead octoate _____percent__ [1] 3

[1] Based on weight of resin.

was dissolved and dispersed in toluene to form a composition containing 20% solvents. The composition was placed in a mechanical blender and agitated until fully homogenized. Oriented (stretched 3X in both directions) heat-set (at a temperature of about 200° C.) polyethylene terephthalate film was employed as the base film dielectric. The base film (½ mil in thickness) was first coated with a thin sub-coating (less than 1 gm./m.$^2$) of a coating composition comprising one part of a methyl phenyl siloxane resin (General Electric SR–32) and 2 parts of tetraisopropyl titanate to form a solution containing 2% solvents in toluene. The base film was passed through the solution, most of the coating was wiped off, and the coated film was heated in the presence of moisture. The coated film was then passed through the solution of silicone resin/filler blend and then between doctor rolls to remove excess coating composition. The coating was dried at room temperature for 1 hour. Thereafter, the coating was cured at 150° C. for 15–30 minutes. The resulting coating was smooth, non-tacky, and firmly adherent to the base polyethylene terephthalate film. Examples 1–12, inclusive, are summarized in Table I.

In Examples 3–12, inclusive, the components of the coating composition were blended together in the following proportions:

Methyl phenyl silicone resin (General Electric SR–32) _____parts__ 4
Finely divided particles _____do_____ 1
Lead octoate catalyst _____percent__ [1] 3

[1] Based on the weight of resin.

The coating procedure and conditions for Examples 3–12 were the same as in Example 1.

Table I, below, records the corona life of the coatings described in Examples 1–12, inclusive, at 23° C. The 5th failure in ten samples was taken as representative of possible corona life. Also listed are the type of finely divided particles employed and the total weight of the coating. All of the films listed under Examples 1–12, inclusive, were coated on both sides of the film. Examples 6–11 represent the use of particles shown in my copending application Serial No. 522,820, now U.S. Patent No. 2,875,098, in the silicone resin coatings. It is observed that better results are obtained with the particles of the present invention when silicone resins only are employed in the coatings.

The "dielectric life" test was carried out as follows:

The film sample to be tested was placed on a brass plate to which the high voltage was to be applied. A brass rod (6" long and ¼" in diameter) was placed on top of the film sample and normal to the brass plate (the film sample was sandwiched between the brass plate and an end of the brass rod). The rod served as the ground electrode. The end of the rod touching the film sample was rounded off at a radius of curvature of 1/16". The pressure exerted on the film was due only to the gravitational forces on the rod. The entire test apparatus was set up in air. Sufficient voltage was applied to the plate to give a voltage stress of 1,000 volts per mil across the sample. Failure of the sample was indicated by a rapid increase in the flow of current between the brass plate and brass rod. At the moment current flowed, an arc was struck between the electrodes, the arc passing through the hole in the film caused by the failure. The abrupt increase in the flow of current was used to trip a relay giving a record of the failure. Ten samples were treated simultaneously. The time to the failure of the fifth sample was used as a measure of the dielectric life (under corona discharge conditions) of the material tested.

Table I

DIELECTRIC LIFE OF POLYETHYLENE TEREPHTHALATE FILM (0.5 MIL THICKNESS) COATED WITH SILICONE RESIN/FINELY DIVIDED PARTICLES COMPOSITION

| Ex. | Type of Particle | Coating Weight Total, gm./m.$^2$ | Dielectric Life (Hrs.) at 1,000 volts/mil—23° C. (time to 5th failure of ten samples) |
|---|---|---|---|
| Control | No coating | none | 7.5 |
| 1 | Estersil (described in U.S.P. 2,657,149) | 17 | 200 |
| 2 | ____do____ | ____ | 300 |
| 3 | ____do____ | 20.8 | 113 |
| 4 | SiO$_2$ vapor-phase type ("Cab-O-Sil").[1] | 14.4 | 34.8 |
| 5 | SiO$_2$ diatomaceous type ("Celite 270").[2] | 8.9 | 20.6 |
| 6 | Zinc Oxide | 8.1 | 34.8 |
| 7 | Titanium dioxide (TiO$_2$) | 7.2 | 40.5 |
| 8 | Calcium carbonate (CaCO$_3$) | 9.6 | 25.2 |
| 9 | Aluminum oxide (Al$_2$O$_3$) | 11.5 | 22.0 |
| 10 | "Fine alumina" (AlOOH) | 18.3 | 59.0 |
| 11 | Iron oxide (Fe$_2$O$_3$) | 9.5 | 24.4 |
| 12 | Magnesium trisilicate (Mg(SiO$_3$)$_3$) | 9.8 | 16.3 |

[1] "Cab-O-Sil"—Godfrey L. Cabot, Inc.
[2] "Celite" 270—Johns-Manville Corporation.

In Examples 13 and 14 the components were blended together in the following proportion:

Methyl phenyl silicone resin _____parts__ 3
Finely divided particles _____do_____ 1
Lead octoate catalyst _____percent__ [1] 3

[1] Based on the weight of resin.

The coating procedure and conditions for Examples 13–14 were the same as for Examples 1–12.

Table II, below, records the corona life of the coatings described in Examples 13 and 14, inclusive, at 23° C. The 5th failure in ten samples was taken as representative of possible corona life. Also listed are the type of finely divided particles employed and total weight of the coating. The films listed under Examples 13 and 14, were coated on both sides of the film.

Table II
DIELECTRIC LIFE OF POLYETHYLENE TEREPHTHALATE FILM (0.5 MIL THICKNESS) COATED WITH SILICONE RESIN/FINELY DIVIDED PARTICLES COMPOSITION

| Ex. | Type of Particle | Coating Weight Total, gm./m.² | Dielectric Life (Hrs.) at 1,000 volts/mil— 23° C. (time to 5th failure of 10 samples) |
|---|---|---|---|
| Control | No coating | None | 7.5 |
| 13 | Mica flakes (3,000 mesh) | | 100 |
| 14 | "Suprex"¹ (J. M. Huber Co.). | | 75 |

¹ Hydrous aluminum silicate clay.

I claim:
1. A product of manufacture consisting essentially of a polymeric, thermoplastic, dielectric base film having an adherent, continuous coating of a cured, homogeneous blend consisting essentially of a polymeric silicone resin, and finely divided particles from the group consisting of amorphous silica, estersils, finely divided clays, and mica, said particles having an ultimate average particle size between 5 millimicrons and 5 microns.

2. A product according to claim 1 wherein said coating consists of from 95%–50% by weight of polymeric silicone resin, and from 5%–50% by weight of said particles.

3. A product according to claim 1 wherein the base film is polyethylene terephthalate film.

4. Balanced, heat-set, polyethylene terephthalate film having an adherent, continous coating of a cured, homogeneous blend consisting essentially of a polymeric silicone resin, and finely divided particles from the group consisting of amorphous silica, estersils, finely divided clays, and mica, said particles having an ultimate average particle size between 5 millimicrons and 5 microns.

5. The product according to claim 4 wherein said coating consists of from 95%–50% by weight of polymeric silicone resin, and from 5%–50% by weight of said particles.

6. The process which comprises coating a polymeric, thermoplastic, dielectric base film with a coating composition consisting essentially of a solution of a polymeric silicone resin in a volatile organic solvent for the resin, said solution having dispersed therein finely divided particles from the group consisting of amorphous silica, estersils, finely divided clays, and mica, said particles having an ultimate average particle size between 5 millimicrons and 5 microns.

7. The process of claim 6 wherein said solution contains from 95%–50% by weight, based on the total weight of solids, of the polymeric silicone resin, and from 5%–50% by weight of said particles.

8. The process of claim 6 wherein said base film is polyethylene terephthalate film.

9. The process which comprises coating balanced heat-set, polyethylene terephthalate base film with a coating composition consisting essentially of a solution of from 95%–50% by weight, based on the total weight of solids in said composition, of a polymeric silicone resin in a volatile organic solvent for the resin, said solution having dispersed therein from 5%–50% by weight of finely divided particles from the group consisting of amorphous silica, estersils, finely divided clays, and mica, said particles having an ultimate average particle size between 5 millimicrons and 5 microns.

10. The process which comprises coating a polymeric, thermoplastic, dielectric base film with a coating composition consisting essentially of a solution of a polymeric silicone resin in a volatile organic solvent for the resin, said solution having dispersed therein finely divided particles from the group consisting of amorphous silica, estersils, finely divided clays, and mica, said particles having an ultimate average particle size between 5 millimicrons and 5 microns, and thereafter curing the polymeric silicone resin in the coated film.

11. The process which comprises coating balanced, heat-set polyethylene terephthalate base film with a coating composition consisting essentially of a solution of from 95%–50% by weight, based on the total weight of solids in said composition, of a polymeric silicone resin in a volatile organic solvent for the resin, said solution having dispersed therein from 5%–50% by weight of finely divided particles from the group consisting of amorphous silica, estersils, finely divided clays, and mica, said particles having an ultimate average particle size between 5 millimicrons and 5 microns, and thereafter curing the polymeric silicone resin in the coated film.

12. A product of manufacture consisting essentially of a polymeric, thermoplastic, dielectric base film having an adherent, continuous coating of a cured, homogeenous blend consisting essentially of a polymeric silicon resin and finely divided particles of estersils, said particles having an ultimate average particle size between 5 millimicrons and 5 microns.

13. A product according to claim 12 wherein said coating consists essentially of from 95%–50% by weight of a polymeric silicon resin and from 5%–50% by weight of said estersil particles.

14. A product according to claim 12 wherein the base film is polyethylene terephthalate film.

15. The process which comprises coating a polymeric, thermoplastic, dielectric base film with a coating composition consisting essentially of a solution of a polymeric silicone resin in a volatile organic solvent for the resin, said solution having dispersed therein finely divided particles of estersils, said particles having an ultimate average particle size between 5 millimicrons and 5 microns, and, thereafter, curing the polymeric silicone resin in the coated film.

16. The process which comprises coating a polyethylene terephthalate base film with a composition consisting essentially of a solution of from 95%–50% by weight, based on the total weight of solids in said composition, of a polymeric silicone resin in a volatile organic solvent for the resin, said solution having dispersed therein from 5%–50% by weight of finely divided particles of estersils, said estersil particles having an ultimate average particle size between 5 millimicrons and 5 microns, and, thereafter, curing the polymeric silicone resin in the coated film.

References Cited in the file of this patent
UNITED STATES PATENTS

| 2,494,920 | Warrick | Jan. 17, 1950 |
| 2,740,732 | Peck et al. | Apr. 3, 1956 |
| 2,741,568 | Hayek et al. | Apr. 10, 1956 |
| 2,751,316 | Phillips | June 19, 1956 |
| 2,774,690 | Cockett et al. | Dec. 18, 1956 |
| 2,789,155 | Marshall et al. | Apr. 16, 1957 |
| 2,875,098 | Blatz | Feb. 24, 1959 |

FOREIGN PATENTS

| 708,821 | Great Britain | May 12, 1954 |